(12) United States Patent
Nishimura

(10) Patent No.: US 9,565,480 B2
(45) Date of Patent: Feb. 7, 2017

(54) SYSTEMS AND METHODS FOR SHOWING MEDIA ASSET CONSUMPTION HISTORY

(71) Applicant: Rovi Guides, Inc., Santa Clara, CA (US)

(72) Inventor: Akitaka Nishimura, Tokyo (JP)

(73) Assignee: Rovi Guides, Inc., San Carlos, CA (US)

( * ) Notice: Subject to any disclaimer, the term of this patent is extended or adjusted under 35 U.S.C. 154(b) by 0 days.

(21) Appl. No.: 14/736,466

(22) Filed: Jun. 11, 2015

(65) Prior Publication Data

US 2016/0366485 A1 Dec. 15, 2016

(51) Int. Cl.

| | |
|---|---|
| *H04N 5/445* | (2011.01) |
| *H04N 21/482* | (2011.01) |
| *H04N 21/431* | (2011.01) |
| *H04N 21/442* | (2011.01) |
| *H04N 21/433* | (2011.01) |
| *H04N 21/472* | (2011.01) |
| *H04N 21/485* | (2011.01) |

(52) U.S. Cl.
CPC ...... *H04N 21/4821* (2013.01); *H04N 21/4312* (2013.01); *H04N 21/4318* (2013.01); *H04N 21/4332* (2013.01); *H04N 21/4334* (2013.01); *H04N 21/44222* (2013.01); *H04N 21/47214* (2013.01); *H04N 21/4858* (2013.01)

(58) Field of Classification Search
CPC ..................... H04N 21/4532; H04N 21/44543; H04N 21/44222
USPC ................................ 725/37–61; 715/810–829
See application file for complete search history.

(56) References Cited

U.S. PATENT DOCUMENTS

| | | | | |
|---|---|---|---|---|
| 5,867,226 A | * | 2/1999 | Wehmeyer | H04N 5/44543 348/569 |
| 6,177,931 B1 | * | 1/2001 | Alexander | G06Q 30/0269 348/565 |
| 6,239,794 B1 | | 5/2001 | Yuen et al. | |
| 6,388,714 B1 | | 5/2002 | Schein et al. | |
| 6,564,378 B1 | | 5/2003 | Satterfield et al. | |
| 6,756,997 B1 | | 6/2004 | Ward, III et al. | |
| 7,137,135 B2 | * | 11/2006 | Schein | H04N 5/44543 348/E5.105 |
| 7,165,098 B1 | | 1/2007 | Boyer et al. | |
| 7,509,662 B2 | * | 3/2009 | Kamen | H04N 5/44543 725/39 |
| 7,761,892 B2 | | 7/2010 | Ellis et al. | |
| 8,046,801 B2 | | 10/2011 | Ellis et al. | |

(Continued)

*Primary Examiner* — Annan Shang
(74) *Attorney, Agent, or Firm* — Ropes & Gray LLP

(57) ABSTRACT

Systems and methods are described herein for a media guidance application that facilitates showing a user's media asset consumption and interaction history by collecting and storing the user's interactions with media assets for later presentation to the user. Specifically, the media guidance application may monitor content that the user is consuming, purchasing, or otherwise interacting with and may store the monitored information. At a later time, the media guidance application may detect that the user wishes to navigate to a past time interval. As a result, the media guidance application may generate for display media asset identifiers corresponding to media assets transmitted to a plurality of users during that time interval and indicate to the user which media asset identifiers correspond to media assets that the user interacted with and also indicate the different types of previously monitored user interactions corresponding to respective media assets.

16 Claims, 5 Drawing Sheets

(56) References Cited

U.S. PATENT DOCUMENTS

| | | | |
|---|---|---|---|
| 8,365,222 B2 * | 1/2013 | Baldwin | H04N 5/44543 709/219 |
| 2002/0174430 A1 | 11/2002 | Ellis et al. | |
| 2003/0110499 A1 | 6/2003 | Knudson et al. | |
| 2004/0060063 A1 * | 3/2004 | Russ | G11B 27/105 725/46 |
| 2004/0237108 A1 | 11/2004 | Drazin et al. | |
| 2005/0251827 A1 | 11/2005 | Ellis et al. | |
| 2010/0153885 A1 | 6/2010 | Yates | |
| 2010/0192182 A1 * | 7/2010 | Baldwin | H04N 21/4821 725/45 |
| 2012/0297420 A1 * | 11/2012 | Mountain | H04N 5/44543 725/40 |
| 2014/0157312 A1 * | 6/2014 | Williams | H04N 21/4126 725/39 |
| 2015/0074718 A1 * | 3/2015 | Moguillansky | H04N 21/482 725/40 |

* cited by examiner

SYSTEMS AND METHODS FOR SHOWING MEDIA ASSET CONSUMPTION HISTORY

BACKGROUND

In conventional systems, users have access to a plethora of media content. In most cases users can view what content will be available in the future and what content has been available in the past. However, with so much content available, users often require assistance in keeping track of content that they have consumed or otherwise interacted with in the past. In addition, users require an efficient system that is able to present that consumption and interaction history to a user.

SUMMARY

Accordingly, systems and methods are described herein for a media guidance application that facilitates showing a user's media asset consumption history by collecting and storing the user's interactions with media assets for later presentation to the user. Specifically, the media guidance application may monitor content that the user is consuming and may store the monitored information. For example, if the user is watching a show, the media guidance application may store a time at which the user started watching the show and if, for example, the user switched to a different channel before the show ended, the media guidance application may store a time at which the user stopped watching the show.

At a later time, the media guidance application may detect that the user wishes to navigate to a time period and channel that corresponds to the show that the user watched. The media guidance application may then generate for display a media asset identifier for the watched show and as part of the display indicate to the user the time the user started watching the show and the time the user stopped watching the show. In another example, the media guidance application may indicate to the user a relative position in the show when the user stopped watching the show.

In some aspects, the media guidance application may generate for display a first plurality of media asset identifiers corresponding to a first plurality of media assets scheduled for transmission to a plurality of users during present and future time intervals. For example, the media guidance application may generate for display a grid that shows on one axis time intervals and on another axis media sources (e.g., channels). The time intervals may be hours and/or half hours. The time intervals may start with a time interval including the current time and include future time intervals. Inside the grid, the media guidance application may generate for display media asset identifiers that correspond to media assets that will be transmitted to users at those time intervals and from those sources that have been displayed.

The media guidance application may then receive a request to navigate to a past time interval. For example, the media guidance application may receive a request to navigate to a past time interval that is adjacent to the current time interval. In another example, the media guidance application may receive a request to navigate to a time interval that is twenty-four hours prior to the current time interval.

Based on the received request, the media guidance application may take a number of actions. The media guidance application may identify a second plurality of media assets that were transmitted to a plurality of users during the requested past time interval. For example, if the current time interval is from 8 PM to 11 PM and the media guidance application receives a request for a time period that is twenty-four hours prior, the media guidance application may identify those programs that were transmitted during the time interval between 8 PM and 11 PM the day before. The media guidance application may also generate for display a second plurality of media asset identifiers corresponding to the second plurality of media assets. Continuing with the example above, the media guidance application may generate for display media asset identifiers corresponding to only those media assets that were transmitted between 8 PM and 11 PM the day before. Alternatively, or additionally, the media guidance application may generate for display a subset of media asset identifiers of the second plurality of media asset identifiers that correspond to media sources that were displayed before a request to navigate to a past time interval was received. The media guidance application may also generate a display where at least one media asset identifier corresponding to a media asset that the user has interacted with in the past is shown.

In another example, the media guidance application may generate for display a grid having on a first axis time periods and media sources on a second axis. The grid may also include media asset identifiers corresponding to media assets that are being transmitted currently and to media assets that are scheduled to be transmitted in the future. The media guidance application may receive the request for a past time interval while the grid is displayed. The media guidance application may receive the request in various ways (e.g., from a user via a remote control).

Based on the received request, the media guidance application may generate for display a second grid that includes media asset identifiers that correspond to media assets that have been transmitted to a plurality of users in the past. The second grid may represent an identical time interval as the first grid, but the time interval would be for a day prior to the current day.

The media guidance application may also visually distinguish a first portion of the second plurality of media asset identifiers, corresponding to media assets associated with previously monitored user interactions, from a second portion of the second plurality of media asset identifiers corresponding to media assets that are not associated with previously monitored user interactions, where a first media asset identifier in the first portion is visually distinguished from a second media asset identifier in the first portion based on type of previously monitored user interaction. For example, the media guidance application may generate for display media asset identifiers that correspond to media assets transmitted during a time period between 8 PM and 11 PM from the past day from five specific media sources. The media guidance application may determine that some of the media asset identifiers correspond to media assets that the user interacted with while others correspond to media assets that the user has not interacted with. The media guidance application may visually distinguish between media asset identifiers that correspond to media assets that the user has interacted with and those media assets identifiers that correspond to media assets that the user has not interacted with by, for example, generating for display an indicator with those media asset identifiers that correspond to media assets that the user has interacted with. Furthermore, the media guidance application may visually distinguish media asset identifiers that correspond to media assets that the user has interacted with in different ways. For example, if a user completely consumed a media asset, the media guidance application may generate for display one indicator and if the user partially consumed another media asset, the media guidance application may generate for display a different indicator with the other media asset.

In some embodiments, types of previously monitored user interactions include fully consuming, partially consuming, purchasing, setting a reminder, recording without consuming, recording and partially consuming, recording and fully consuming, and recording and erasing. For example, if a media asset is a movie, the media guidance application may determine that the user viewed the full movie. Alternatively, the media guidance application may determine that the user only partially viewed the movie. In another example, if the media asset is a song, the media guidance application may determine that the user recorded the song and listened to it fully before erasing it.

In some embodiments, the media guidance application may help a user consume the remainder of a media asset that the user partially consumed in the past if the media asset will be transmitted again in the future using the following steps. The media guidance application may receive an indication from a user to consume a media asset associated with the first media asset identifier. For example, the media guidance application may receive a request from the user that the user desires to continue watching a movie that the user started watching yesterday. The media guidance application may then determine that a type of previously monitored user interaction associated with the media asset is the user partially consuming the media asset. In continuing with the above example, the media guidance application may determine that the user watched a part of the movie yesterday. The media guidance application may further determine that the media asset will be available for consumption at a future time. For example, the same movie may be scheduled to be transmitted six hours from the current time. The media guidance application may retrieve a time interval corresponding to a portion of the media asset that the user has not consumed. For example, the media guidance application may have determined that the user watched the first thirty minutes of a two-hour movie and stored that information. The media guidance application may then retrieve the stored information in order to determine the portion of the movie that the user has not yet consumed. The media guidance application may then schedule, for recording, the portion of the media asset that the user has not consumed. For example, the media guidance application may record only the 1.5 hours of the movie that the user has not watched.

In some embodiments, the media guidance application may help a user consume the remainder of a media asset that the user partially consumed in the past if the media asset is available on demand. The media guidance application may receive an indication from a user to consume a media asset associated with the first media asset identifier. For example, the media guidance application may receive a request from a user to watch the remainder of a sporting event that the user started watching before the user left for work and desires to finish watching after work. The media guidance application may then determine that a type of previously monitored user interaction associated with the media asset is the user partially consuming the media asset. For example, the media guidance application may determine that the user watched a part of the sporting event in the morning, before leaving for work. The media guidance application may then retrieve a time interval corresponding to a portion of the media asset that the user has not consumed. For example, the media guidance application may determine that the user watched one hour of a three-hour sporting event live while it was being broadcast or transmitted to a plurality of users and retrieve a value corresponding to the portion of the sporting event that the user has not watched. The media guidance application may then determine that the media asset is available on demand. The media guidance application may also determine a cost associated with the media asset. Furthermore, the media guidance application may generate for display a prompt to the user indicating a price that the user must pay for the portion of the media asset that the user has not consumed, where the price is a portion of the cost associated with the media asset. For example, if the media guidance application determines that the user viewed half of the sporting event and the total cost to view the sporting event is five dollars, the media guidance application may indicate to the user that the user must pay two dollars and fifty cents for the second half of the sporting event. Based on the user indicating an agreement with the cost, the media guidance application may generate for display the media asset starting from a beginning of the portion of the media asset that has not been consumed. In the example above, the media guidance application may start the media asset with the second half after the user indicates agreement to the cost.

In some embodiments, the media guidance application may generate for display media asset identifiers corresponding to media assets transmitted in the past where media assets identifiers correspond to those media assets that a user previously interacted with together with indicators of those interactions. In order to properly generate such a display, the media guidance application may determine the first portion of the second plurality of media asset identifiers and also determine the second portion of the second plurality of media asset identifiers. For example, the media guidance application may include in the first portion those media asset identifiers that correspond to media assets that the user has previously interacted with and include in the second portion those media asset identifiers that correspond to media assets that the user has not previously interacted with. Furthermore, the media guidance application may generate for display each media asset identifier associated with the first portion such that each media asset identifier includes an indicator indicating a corresponding previously monitored user interaction. Specifically, the media guidance application may generate for display the first media asset identifier that includes a first indicator corresponding to a first type of previously monitored user interaction and the second media asset identifier that includes a second indicator corresponding to a second type of previously monitored user interaction. For example, the media guidance application may determine that the first media asset identifier corresponds to a media asset that the user partially consumed and the second media asset identifier corresponds to a media asset that the user fully consumed. The media guidance application may include with the first media asset identifier a square that indicates partial consumption of the media asset and an oval with the second media asset identifier that indicates full consumption of the media asset.

In some embodiments, the media guidance application may use a database in determining which media assets have associated previously monitored user interactions. The media guidance application may cross-reference each media asset of the second plurality of media assets with a database listing media assets and previously monitored user interactions corresponding to those media assets. For example, the media guidance application may store monitored user interactions in the database. If the media guidance application determined that a user recorded a show and then erased it without watching the show, the media guidance application may store that information in the database. The media guidance application may then determine which media assets of the second plurality of media assets are listed in the database and select the first portion based on the determination. For example, the media guidance application may cross-reference all media assets for a requested past time interval with media assets listed in the database and select those media asset identifiers that correspond to media assets that the user has interacted with.

In some embodiments, the media guidance application may enable the user to modify indicators associated with each previously monitored user interaction. The media guidance application may generate for display a plurality of indicators for a plurality of previously monitored user interactions and a plurality of options that enable the user to modify each indicator of the plurality of indicators. For example, the media guidance application may generate for display a square to correspond with partially viewing a media asset and an oval for fully viewing a media asset. The media guidance application may also generate for display an option for a user to change the square to another symbol and also change an oval for another symbol. The media guidance application may, based on a user selection of an option of the plurality of options, modify the plurality of indicators based on the selected option. For example, the media guidance application may determine that the user selected a rectangle to replace the square as an indicator that a media asset was fully consumed and a circle to replace an oval as an indicator that the media asset was partially consumed. As a result, the media guidance application may change those indicators based on user selection.

In some embodiments, the media guidance application may, based on a user selection of the first media asset identifier, generate for display information associated with the monitored user interaction corresponding to a media asset associated with the first media asset identifier. For example, the media guidance application may detect that the user selected a media asset identifier corresponding to a media asset that was recorded, consumed, and later erased. The media guidance application may generate for display information indicating when the media asset was transmitted and recorded, when the media asset was consumed, and when the recording of the media asset was erased.

In some embodiments, the media guidance application may, based on a first user input, generate for display media asset identifiers associated with a first type of previously monitored user interactions and, based on a second user input, generate for display media asset identifiers associated with a second type of previously monitored user interactions. For example, if the media guidance application detects a user input requesting only media asset identifiers corresponding to media assets that the user has partially consumed, the media guidance application may generate for display only media asset identifiers corresponding to media assets that the user has partially consumed. If the media guidance application detects a user input requesting only media asset identifiers corresponding to media assets that the user has recorded and erased without consuming, the media guidance application may generate for display only media asset identifiers corresponding to those media assets that the user recorded and erased without consuming.

In some embodiments, the media guidance application may generate for display media asset identifiers corresponding to media assets transmitted in the past in a grid that includes time intervals on one axis and media sources on another axis. The media guidance application may generate for display a first plurality of indicators corresponding to a plurality of content sources along a first axis and a second plurality of indicators corresponding to a plurality of time periods along a second axis, where the plurality of time periods is within the time interval. The media guidance application may then generate for display the second plurality of media asset identifiers, where each media asset identifier of the second plurality of media asset identifiers is displayed according to a respective source and a respective time period. Additionally, the media guidance application may generate for display, for each media asset identifier in the first portion of the second plurality of media asset identifiers, an indicator corresponding to a respective type of previously monitored user interaction. For example, the media guidance application may generate for display a grid that includes a past time interval between 8 AM and 11 AM and include media sources corresponding to five specific channels. The grid may also include media asset identifiers for movies, shows, and new programs that were transmitted during the above time interval on the above channels. The media guidance application may also include with the media asset identifiers indicators of corresponding previously monitored user interactions with respect to the media assets corresponding to the respective media asset identifiers.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which.

DESCRIPTION

Figure 1:
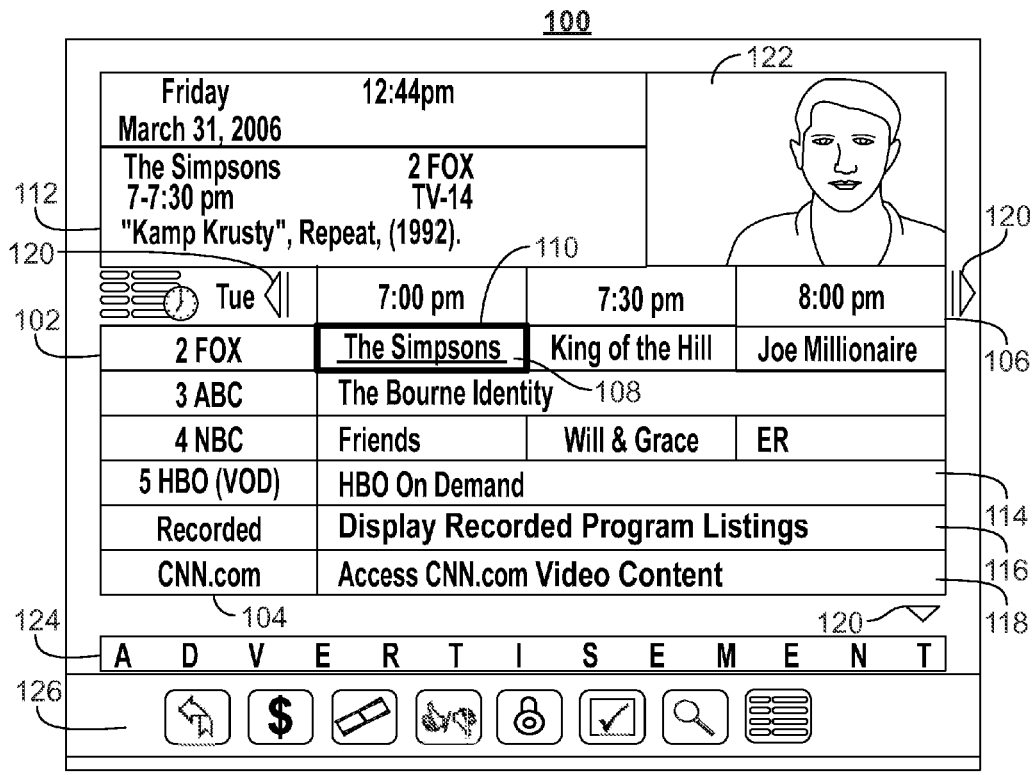
FIG. 1 shows an illustrative embodiment of a display screen that may be used to provide media guidance application listings and other media guidance information, in accordance with some embodiments of the disclosure.

The amount of content available to users in any given content delivery system can be substantial. Consequently, many users desire a form of media guidance through an interface that allows users to efficiently navigate content selections and easily identify content that they may desire. An application that provides such guidance is referred to herein as an interactive media guidance application or, sometimes, a media guidance application or a guidance application.

Interactive media guidance applications may take various forms depending on the content for which they provide guidance. One typical type of media guidance application is an interactive television program guide. Interactive television program guides (sometimes referred to as electronic program guides) are well-known guidance applications that, among other things, allow users to navigate among and locate many types of content or media assets. Interactive media guidance applications may generate graphical user interface screens that enable a user to navigate among, locate and select content. As referred to herein, the terms "media asset" and "content" should be understood to mean an electronically consumable user asset, such as television programming, as well as pay-per-view programs, on-demand programs (as in video-on-demand (VOD) systems), Internet content (e.g., streaming content, downloadable content, Webcasts, etc.), video clips, audio, content information, pictures, rotating images, documents, playlists, websites, articles, books, electronic books, blogs, advertisements, chat sessions, social media, applications, games, and/or any other media or multimedia and/or combination of the same. Guidance applications also allow users to navigate among and locate content. As referred to herein, the term "multimedia" should be understood to mean content that utilizes at least two different content forms described above, for example, text, audio, images, video, or interactivity content forms. Content may be recorded, played, displayed or accessed by user equipment devices, but can also be part of a live performance.

The media guidance application and/or any instructions for performing any of the embodiments discussed herein may be encoded on computer readable media. Computer readable media includes any media capable of storing data. The computer readable media may be transitory, including, but not limited to, propagating electrical or electromagnetic signals, or may be non-transitory including, but not limited to, volatile and non-volatile computer memory or storage devices such as a hard disk, floppy disk, USB drive, DVD, CD, media cards, register memory, processor caches, Random Access Memory ("RAM"), etc.

With the advent of the Internet, mobile computing, and high-speed wireless networks, users are accessing media on user equipment devices on which they traditionally did not. As referred to herein, the phrase "user equipment device," "user equipment," "user device," "electronic device," "electronic equipment," "media equipment device," or "media device" should be understood to mean any device for accessing the content described above, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a hand-held computer, a stationary telephone, a personal digital assistant (PDA), a mobile telephone, a portable video player, a portable music player, a portable gaming machine, a smart phone, or any other television equipment, computing equipment, or wireless device, and/or combination of the same. In some embodiments, the user equipment device may have a front facing screen and a rear facing screen, multiple front screens, or multiple angled screens. In some embodiments, the user equipment device may have a front facing camera and/or a rear facing camera. On these user equipment devices, users may be able to navigate among and locate the same content available through a television. Consequently, media guidance may be available on these devices, as well. The guidance provided may be for content available only through a television, for content available only through one or more of other types of user equipment devices, or for content available both through a television and one or more of the other types of user equipment devices. The media guidance applications may be provided as on-line applications (i.e., provided on a web-site), or as stand-alone applications or clients on user equipment devices. Various devices and platforms that may implement media guidance applications are described in more detail below.

One of the functions of the media guidance application is to provide media guidance data to users. As referred to herein, the phrase "media guidance data" or "guidance data" should be understood to mean any data related to content or data used in operating the guidance application. For example, the guidance data may include program information, guidance application settings, user preferences, user profile information, media listings, media-related information (e.g., broadcast times, broadcast channels, titles, descriptions, ratings information (e.g., parental control ratings, critic's ratings, etc.), genre or category information, actor information, logo data for broadcasters' or providers' logos, etc.), media format (e.g., standard definition, high definition, 3D, etc.), advertisement information (e.g., text, images, media clips, etc.), on-demand information, blogs, websites, and any other type of guidance data that is helpful for a user to navigate among and locate desired content selections.

Figure 2:
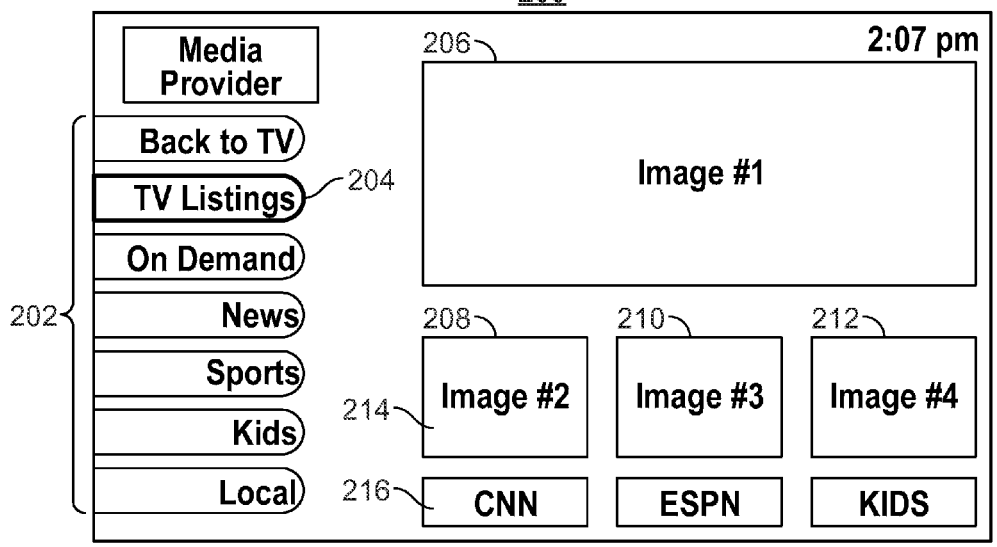
FIG. 2 shows another illustrative embodiment of a display screen that may be used to provide media guidance application listings, in accordance with some embodiments of the disclosure.

FIGS. 1-2 show illustrative display screens that may be used to provide media guidance data. The display screens shown in FIGS. 1-2 may be implemented on any suitable user equipment device or platform. While the displays of FIGS. 1-2 are illustrated as full screen displays, they may also be fully or partially overlaid over content being displayed. A user may indicate a desire to access content information by selecting a selectable option provided in a display screen (e.g., a menu option, a listings option, an icon, a hyperlink, etc.) or pressing a dedicated button (e.g., a GUIDE button) on a remote control or other user input interface or device. In response to the user's indication, the media guidance application may provide a display screen with media guidance data organized in one of several ways, such as by time and channel in a grid, by time, by channel, by source, by content type, by category (e.g., movies, sports, news, children, or other categories of programming), or other predefined, user-defined, or other organization criteria.

FIG. 1 shows illustrative grid of a program listings display 100 arranged by time and channel that also enables access to different types of content in a single display. Display 100 may include grid 102 with: (1) a column of channel/content type identifiers 104, where each channel/content type identifier (which is a cell in the column) identifies a different channel or content type available; and (2) a row of time identifiers 106, where each time identifier (which is a cell in the row) identifies a time block of programming. Grid 102 also includes cells of program listings, such as program listing 108, where each listing provides the title of the program provided on the listing's associated channel and time. With a user input device, a user can select program listings by moving highlight region 110. Information relating to the program listing selected by highlight region 110 may be provided in program information region 112. Region 112 may include, for example, the program title, the program description, the time the program is provided (if applicable), the channel the program is on (if applicable), the program's rating, and other desired information.

In addition to providing access to linear programming (e.g., content that is scheduled to be transmitted to a plurality of user equipment devices at a predetermined time and is provided according to a schedule), the media guidance application also provides access to non-linear programming (e.g., content accessible to a user equipment device at any time and is not provided according to a schedule). Non-linear programming may include content from different content sources including on-demand content (e.g., VOD), Internet content (e.g., streaming media, downloadable media, etc.), locally stored content (e.g., content stored on any user equipment device described above or other storage device), or other time-independent content. On-demand content may include movies or any other content provided by a particular content provider (e.g., HBO On Demand providing "The Sopranos" and "Curb Your Enthusiasm"). HBO ON DEMAND is a service mark owned by Time Warner Company L.P. et al. and THE SOPRANOS and CURB YOUR ENTHUSIASM are trademarks owned by the Home Box Office, Inc. Internet content may include web events, such as a chat session or Webcast, or content available on-demand as streaming content or downloadable content through an Internet web site or other Internet access (e.g. FTP).

Grid 102 may provide media guidance data for non-linear programming including on-demand listing 114, recorded content listing 116, and Internet content listing 118. A display combining media guidance data for content from different types of content sources is sometimes referred to as a "mixed-media" display. Various permutations of the types of media guidance data that may be displayed that are different than display 100 may be based on user selection or guidance application definition (e.g., a display of only recorded and broadcast listings, only on-demand and broadcast listings, etc.). As illustrated, listings 114, 116, and 118 are shown as spanning the entire time block displayed in grid 102 to indicate that selection of these listings may provide access to a display dedicated to on-demand listings, recorded listings, or Internet listings, respectively. In some embodiments, listings for these content types may be included directly in grid 102. Additional media guidance data may be displayed in response to the user selecting one of the navigational icons 120. (Pressing an arrow key on a user input device may affect the display in a similar manner as selecting navigational icons 120.)

Display 100 may also include video region 122, advertisement 124, and options region 126. Video region 122 may allow the user to view and/or preview programs that are currently available, will be available, or were available to the user. The content of video region 122 may correspond to, or be independent from, one of the listings displayed in grid 102. Grid displays including a video region are sometimes referred to as picture-in-guide (PIG) displays. PIG displays and their functionalities are described in greater detail in Satterfield et al. U.S. Pat. No. 6,564,378, issued May 13, 2003 and Yuen et al. U.S. Pat. No. 6,239,794, issued May 29, 2001, which are hereby incorporated by reference herein in their entireties. PIG displays may be included in other media guidance application display screens of the embodiments described herein.

Advertisement 124 may provide an advertisement for content that, depending on a viewer's access rights (e.g., for subscription programming), is currently available for viewing, will be available for viewing in the future, or may never become available for viewing, and may correspond to or be unrelated to one or more of the content listings in grid 102. Advertisement 124 may also be for products or services related or unrelated to the content displayed in grid 102. Advertisement 124 may be selectable and provide further information about content, provide information about a product or a service, enable purchasing of content, a product, or a service, provide content relating to the advertisement, etc. Advertisement 124 may be targeted based on a user's profile/preferences, monitored user activity, the type of display provided, or on other suitable targeted advertisement bases.

While advertisement 124 is shown as rectangular or banner shaped, advertisements may be provided in any suitable size, shape, and location in a guidance application display. For example, advertisement 124 may be provided as a rectangular shape that is horizontally adjacent to grid 102. This is sometimes referred to as a panel advertisement. In addition, advertisements may be overlaid over content or a guidance application display or embedded within a display. Advertisements may also include text, images, rotating images, video clips, or other types of content described above. Advertisements may be stored in a user equipment device having a guidance application, in a database connected to the user equipment, in a remote location (including streaming media servers), or on other storage means, or a combination of these locations. Providing advertisements in a media guidance application is discussed in greater detail in, for example, Knudson et al., U.S. Patent Application Publication No. 2003/0110499, filed Jan. 17, 2003; Ward, III et al. U.S. Pat. No. 6,756,997, issued Jun. 29, 2004; and Schein et al. U.S. Pat. No. 6,388,714, issued May 14, 2002, which are hereby incorporated by reference herein in their entireties. It will be appreciated that advertisements may be included in other media guidance application display screens of the embodiments described herein.

Options region 126 may allow the user to access different types of content, media guidance application displays, and/or media guidance application features. Options region 126 may be part of display 100 (and other display screens described herein), or may be invoked by a user by selecting an on-screen option or pressing a dedicated or assignable button on a user input device. The selectable options within options region 126 may concern features related to program listings in grid 102 or may include options available from a main menu display. Features related to program listings may include searching for other air times or ways of receiving a program, recording a program, enabling series recording of a program, setting program and/or channel as a favorite, purchasing a program, or other features. Options available from a main menu display may include search options, VOD options, parental control options, Internet options, cloud-based options, device synchronization options, second screen device options, options to access various types of media guidance data displays, options to subscribe to a premium service, options to edit a user's profile, options to access a browse overlay, or other options.

The media guidance application may be personalized based on a user's preferences. A personalized media guidance application allows a user to customize displays and features to create a personalized "experience" with the media guidance application. This personalized experience may be created by allowing a user to input these customizations and/or by the media guidance application monitoring user activity to determine various user preferences. Users may access their personalized guidance application by logging in or otherwise identifying themselves to the guidance application. Customization of the media guidance application may be made in accordance with a user profile. The customizations may include varying presentation schemes (e.g., color scheme of displays, font size of text, etc.), aspects of content listings displayed (e.g., only HDTV or only 3D programming, user-specified broadcast channels based on favorite channel selections, re-ordering the display of channels, recommended content, etc.), desired recording features (e.g., recording or series recordings for particular users, recording quality, etc.), parental control settings, customized presentation of Internet content (e.g., presentation of social media content, e-mail, electronically delivered articles, etc.) and other desired customizations.

The media guidance application may allow a user to provide user profile information or may automatically compile user profile information. The media guidance application may, for example, monitor the content the user accesses and/or other interactions the user may have with the guidance application. Additionally, the media guidance application may obtain all or part of other user profiles that are related to a particular user (e.g., from other web sites on the Internet the user accesses, such as www.allrovi.com, from other media guidance applications the user accesses, from other interactive applications the user accesses, from another user equipment device of the user, etc.), and/or obtain information about the user from other sources that the media guidance application may access. As a result, a user can be provided with a unified guidance application experience across the user's different user equipment devices. This type of user experience is described in greater detail below in connection with FIG. 4. Additional personalized media guidance application features are described in greater detail in Ellis et al., U.S. Patent Application Publication No. 2005/0251827, filed Jul. 11, 2005, Boyer et al., U.S. Pat. No. 7,165,098, issued Jan. 16, 2007, and Ellis et al., U.S. Patent Application Publication No. 2002/0174430, filed Feb. 21, 2002, which are hereby incorporated by reference herein in their entireties.

Another display arrangement for providing media guidance is shown in FIG. 2. Video mosaic display 200 includes selectable options 202 for content information organized based on content type, genre, and/or other organization criteria. In display 200, television listings option 204 is selected, thus providing listings 206, 208, 210, and 212 as broadcast program listings. In display 200 the listings may provide graphical images including cover art, still images from the content, video clip previews, live video from the content, or other types of content that indicate to a user the content being described by the media guidance data in the listing. Each of the graphical listings may also be accompanied by text to provide further information about the content associated with the listing. For example, listing 208 may include more than one portion, including media portion 214 and text portion 216. Media portion 214 and/or text portion 216 may be selectable to view content in full-screen or to view information related to the content displayed in media portion 214 (e.g., to view listings for the channel that the video is displayed on).

The listings in display 200 are of different sizes (i.e., listing 206 is larger than listings 208, 210, and 212), but if desired, all the listings may be the same size. Listings may be of different sizes or graphically accentuated to indicate degrees of interest to the user or to emphasize certain content, as desired by the content provider or based on user preferences. Various systems and methods for graphically accentuating content listings are discussed in, for example, Yates, U.S. Patent Application Publication No. 2010/0153885, filed Nov. 12, 2009, which is hereby incorporated by reference herein in its entirety.

Figure 3:
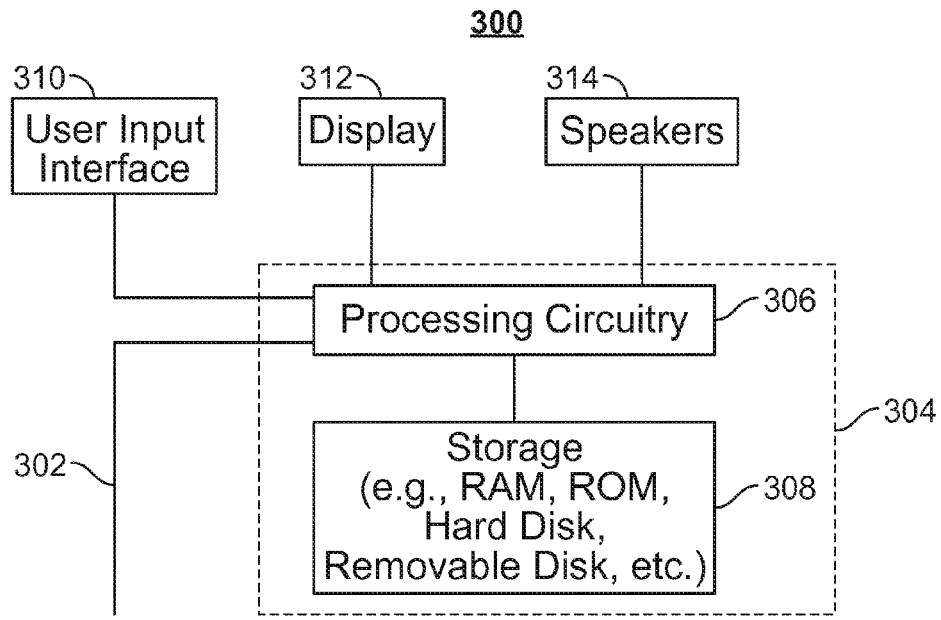
FIG. 3 is a block diagram of an illustrative device in accordance with some embodiments of the disclosure.

Users may access content and the media guidance application (and its display screens described above and below) from one or more of their user equipment devices. FIG. 3 shows a generalized embodiment of illustrative user equipment device 300. More specific implementations of user equipment devices are discussed below in connection with FIG. 4. User equipment device 300 may receive content and data via input/output (hereinafter "I/O") path 302. I/O path 302 may provide content (e.g., broadcast programming, on-demand programming, Internet content, content available over a local area network (LAN) or wide area network (WAN), and/or other content) and data to control circuitry 304, which includes processing circuitry 306 and storage 308. Control circuitry 304 may be used to send and receive commands, requests, and other suitable data using I/O path 302. I/O path 302 may connect control circuitry 304 (and specifically processing circuitry 306) to one or more communications paths (described below). I/O functions may be provided by one or more of these communications paths, but are shown as a single path in FIG. 3 to avoid overcomplicating the drawing.

Control circuitry 304 may be based on any suitable processing circuitry such as processing circuitry 306. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, control circuitry 304 executes instructions for a media guidance application stored in memory (i.e., storage 308). Specifically, control circuitry 304 may be instructed by the media guidance application to perform the functions discussed above and below. For example, the media guidance application may provide instructions to control circuitry 304 to generate the media guidance displays. In some implementations, any action performed by control circuitry 304 may be based on instructions received from the media guidance application.

In client-server based embodiments, control circuitry 304 may include communications circuitry suitable for communicating with a guidance application server or other networks or servers. The instructions for carrying out the above mentioned functionality may be stored on the guidance application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths (which is described in more detail in connection with FIG. 4). In addition, communications circuitry may include circuitry that enables peer-to-peer communication of user equipment devices, or communication of user equipment devices in locations remote from each other (described in more detail below).

Memory may be an electronic storage device provided as storage 308 that is part of control circuitry 304. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 308 may be used to store various types of content described herein as well as media guidance data described above. Nonvolatile memory may also be used (e.g., to launch a boot-up routine and other instructions). Cloud-based storage, described in relation to FIG. 4, may be used to supplement storage 308 or instead of storage 308.

Control circuitry 304 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304 may also include scaler circuitry for upconverting and downconverting content into the preferred output format of the user equipment 300. Circuitry 304 may also include digital-to-analog converter circuitry and analog-to-digital converter circuitry for converting between digital and analog signals. The tuning and encoding circuitry may be used by the user equipment device to receive and to display, to play, or to record content. The tuning and encoding circuitry may also be used to receive guidance data. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from user equipment 300, the tuning and encoding circuitry (including multiple tuners) may be associated with storage 308.

A user may send instructions to control circuitry 304 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of user equipment device 300. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive media guidance application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of user equipment device 300 or may be stand-alone units. The audio component of videos and other content displayed on display 312 may be played through speakers 314. In some embodiments, the audio may be distributed to a receiver (not shown), which processes and outputs the audio via speakers 314.

The guidance application may be implemented using any suitable architecture. For example, it may be a stand-alone application wholly-implemented on user equipment device 300. In such an approach, instructions of the application are stored locally (e.g., in storage 308), and data for use by the application is downloaded on a periodic basis (e.g., from an out-of-band feed, from an Internet resource, or using another suitable approach). Control circuitry 304 may retrieve instructions of the application from storage 308 and process the instructions to generate any of the displays discussed herein. Based on the processed instructions, control circuitry 304 may determine what action to perform when input is received from input interface 310. For example, movement of a cursor on a display up/down may be indicated by the processed instructions when input interface 310 indicates that an up/down button was selected.

In some embodiments, the media guidance application is a client-server based application. Data for use by a thick or thin client implemented on user equipment device 300 is retrieved on-demand by issuing requests to a server remote to the user equipment device 300. In one example of a client-server based guidance application, control circuitry 304 runs a web browser that interprets web pages provided by a remote server. For example, the remote server may store the instructions for the application in a storage device. The remote server may process the stored instructions using circuitry (e.g., control circuitry 304) and generate the displays discussed above and below. The client device may receive the displays generated by the remote server and may display the content of the displays locally on equipment device 300. This way, the processing of the instructions is performed remotely by the server while the resulting displays are provided locally on equipment device 300. Equipment device 300 may receive inputs from the user via input interface 310 and transmit those inputs to the remote server for processing and generating the corresponding displays. For example, equipment device 300 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to equipment device 300 for presentation to the user.

In some embodiments, the media guidance application is downloaded and interpreted or otherwise run by an interpreter or virtual machine (run by control circuitry 304). In some embodiments, the guidance application may be encoded in the ETV Binary Interchange Format (EBIF), received by control circuitry 304 as part of a suitable feed, and interpreted by a user agent running on control circuitry 304. For example, the guidance application may be an EBIF application. In some embodiments, the guidance application may be defined by a series of JAVA-based files that are received and run by a local virtual machine or other suitable middleware executed by control circuitry 304. In some of such embodiments (e.g., those employing MPEG-2 or other digital media encoding schemes), the guidance application may be, for example, encoded and transmitted in an MPEG-2 object carousel with the MPEG audio and video packets of a program.

Figure 4:
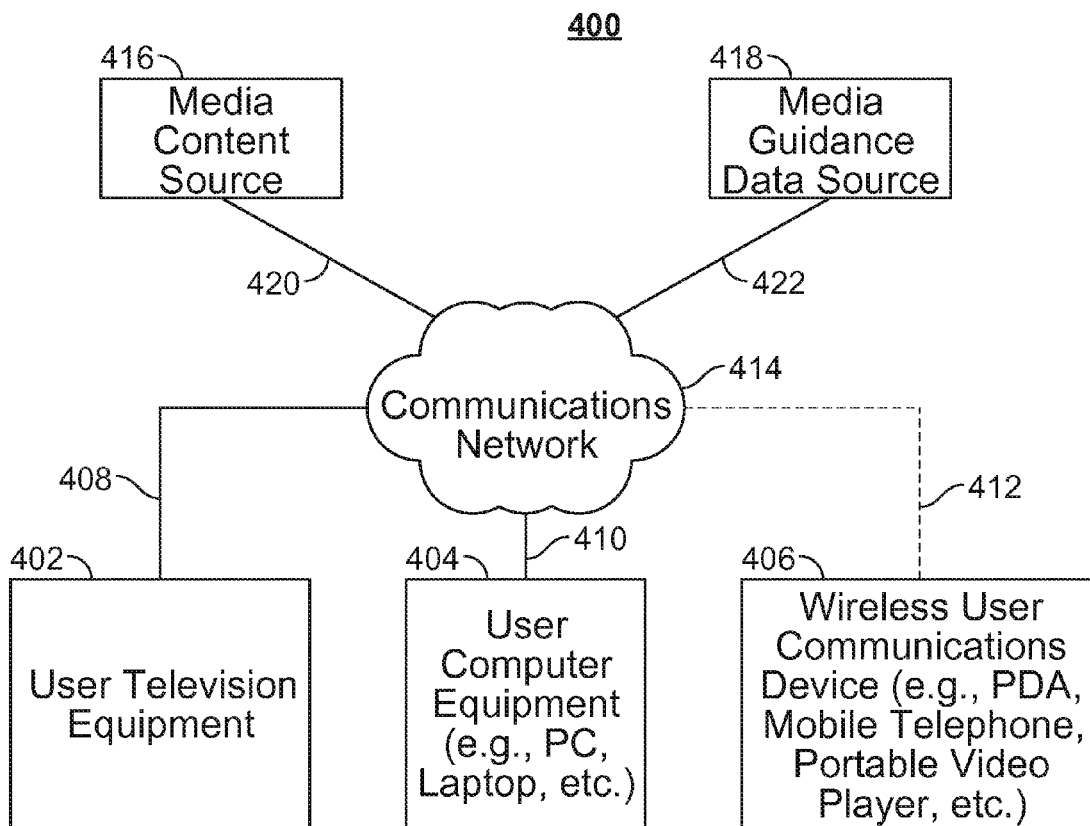
FIG. 4 is a block diagram of an illustrative media system in accordance with some embodiments of the disclosure.

User equipment device 300 of FIG. 3 can be implemented in system 400 of FIG. 4 as user television equipment 402, user computer equipment 404, wireless user communications device 406, or any other type of user equipment suitable for accessing content, such as a non-portable gaming machine. For simplicity, these devices may be referred to herein collectively as user equipment or user equipment devices, and may be substantially similar to user equipment devices described above. User equipment devices, on which a media guidance application may be implemented, may function as a standalone device or may be part of a network of devices. Various network configurations of devices may be implemented and are discussed in more detail below.

A user equipment device utilizing at least some of the system features described above in connection with FIG. 3 may not be classified solely as user television equipment 402, user computer equipment 404, or a wireless user communications device 406. For example, user television equipment 402 may, like some user computer equipment 404, be Internet-enabled allowing for access to Internet content, while user computer equipment 404 may, like some television equipment 402, include a tuner allowing for access to television programming. The media guidance application may have the same layout on various different types of user equipment or may be tailored to the display capabilities of the user equipment. For example, on user computer equipment 404, the guidance application may be provided as a web site accessed by a web browser. In another example, the guidance application may be scaled down for wireless user communications devices 406.

In system 400, there is typically more than one of each type of user equipment device but only one of each is shown in FIG. 4 to avoid overcomplicating the drawing. In addition, each user may utilize more than one type of user equipment device and also more than one of each type of user equipment device.

In some embodiments, a user equipment device (e.g., user television equipment 402, user computer equipment 404, wireless user communications device 406) may be referred to as a "second screen device." For example, a second screen device may supplement content presented on a first user equipment device. The content presented on the second screen device may be any suitable content that supplements the content presented on the first device. In some embodiments, the second screen device provides an interface for adjusting settings and display preferences of the first device. In some embodiments, the second screen device is configured for interacting with other second screen devices or for interacting with a social network. The second screen device can be located in the same room as the first device, a different room from the first device but in the same house or building, or in a different building from the first device.

The user may also set various settings to maintain consistent media guidance application settings across in-home devices and remote devices. Settings include those described herein, as well as channel and program favorites, programming preferences that the guidance application utilizes to make programming recommendations, display preferences, and other desirable guidance settings. For example, if a user sets a channel as a favorite on, for example, the web site www.allrovi.com on their personal computer at their office, the same channel would appear as a favorite on the user's in-home devices (e.g., user television equipment and user computer equipment) as well as the user's mobile devices, if desired. Therefore, changes made on one user equipment device can change the guidance experience on another user equipment device, regardless of whether they are the same or a different type of user equipment device. In addition, the changes made may be based on settings input by a user, as well as user activity monitored by the guidance application.

The user equipment devices may be coupled to communications network 414. Namely, user television equipment 402, user computer equipment 404, and wireless user communications device 406 are coupled to communications network 414 via communications paths 408, 410, and 412, respectively. Communications network 414 may be one or more networks including the Internet, a mobile phone network, mobile voice or data network (e.g., a 4G or LTE network), cable network, public switched telephone network, or other types of communications network or combinations of communications networks. Paths 408, 410, and 412 may separately or together include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. Path 412 is drawn with dotted lines to indicate that in the exemplary embodiment shown in FIG. 4 it is a wireless path and paths 408 and 410 are drawn as solid lines to indicate they are wired paths (although these paths may be wireless paths, if desired). Communications with the user equipment devices may be provided by one or more of these communications paths, but are shown as a single path in FIG. 4 to avoid overcomplicating the drawing.

Although communications paths are not drawn between user equipment devices, these devices may communicate directly with each other via communication paths, such as those described above in connection with paths 408, 410, and 412, as well as other short-range point-to-point communication paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. The user equipment devices may also communicate with each other directly through an indirect path via communications network 414.

System 400 includes content source 416 and media guidance data source 418 coupled to communications network 414 via communication paths 420 and 422, respectively. Paths 420 and 422 may include any of the communication paths described above in connection with paths 408, 410, and 412. Communications with the content source 416 and media guidance data source 418 may be exchanged over one or more communications paths, but are shown as a single path in FIG. 4 to avoid overcomplicating the drawing. In addition, there may be more than one of each of content source 416 and media guidance data source 418, but only one of each is shown in FIG. 4 to avoid overcomplicating the drawing. (The different types of each of these sources are discussed below.) If desired, content source 416 and media guidance data source 418 may be integrated as one source device. Although communications between sources 416 and 418 with user equipment devices 402, 404, and 406 are shown as through communications network 414, in some embodiments, sources 416 and 418 may communicate directly with user equipment devices 402, 404, and 406 via communication paths (not shown) such as those described above in connection with paths 408, 410, and 412.

Content source 416 may include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Content source 416 may be the originator of content (e.g., a television broadcaster, a Webcast provider, etc.) or may not be the originator of content (e.g., an on-demand content provider, an Internet provider of content of broadcast programs for downloading, etc.). Content source 416 may include cable sources, satellite providers, on-demand providers, Internet providers, over-the-top content providers, or other providers of content. Content source 416 may also include a remote media server used to store different types of content (including video content selected by a user), in a location remote from any of the user equipment devices. Systems and methods for remote storage of content, and providing remotely stored content to user equipment are discussed in greater detail in connection with Ellis et al., U.S. Pat. No. 7,761,892, issued Jul. 20, 2010, which is hereby incorporated by reference herein in its entirety.

Media guidance data source 418 may provide media guidance data, such as the media guidance data described above. Media guidance data may be provided to the user equipment devices using any suitable approach. In some embodiments, the guidance application may be a stand-alone interactive television program guide that receives program guide data via a data feed (e.g., a continuous feed or trickle feed). Program schedule data and other guidance data may be provided to the user equipment on a television channel sideband, using an in-band digital signal, using an out-of-band digital signal, or by any other suitable data transmission technique. Program schedule data and other media guidance data may be provided to user equipment on multiple analog or digital television channels.

In some embodiments, guidance data from media guidance data source 418 may be provided to users' equipment using a client-server approach. For example, a user equipment device may pull media guidance data from a server, or a server may push media guidance data to a user equipment device. In some embodiments, a guidance application client residing on the user's equipment may initiate sessions with source 418 to obtain guidance data when needed, e.g., when the guidance data is out of date or when the user equipment device receives a request from the user to receive data. Media guidance may be provided to the user equipment with any suitable frequency (e.g., continuously, daily, a user-specified period of time, a system-specified period of time, in response to a request from user equipment, etc.). Media guidance data source 418 may provide user equipment devices 402, 404, and 406 the media guidance application itself or software updates for the media guidance application.

In some embodiments, the media guidance data may include viewer data. For example, the viewer data may include current and/or historical user activity information (e.g., what content the user typically watches, what times of day the user watches content, whether the user interacts with a social network, at what times the user interacts with a social network to post information, what types of content the user typically watches (e.g., pay TV or free TV), mood, brain activity information, etc.). The media guidance data may also include subscription data. For example, the subscription data may identify to which sources or services a given user subscribes and/or to which sources or services the given user has previously subscribed but later terminated access (e.g., whether the user subscribes to premium channels, whether the user has added a premium level of services, whether the user has increased Internet speed). In some embodiments, the viewer data and/or the subscription data may identify patterns of a given user for a period of more than one year. The media guidance data may include a model (e.g., a survivor model) used for generating a score that indicates a likelihood a given user will terminate access to a service/source. For example, the media guidance application may process the viewer data with the subscription data using the model to generate a value or score that indicates a likelihood of whether the given user will terminate access to a particular service or source. In particular, a higher score may indicate a higher level of confidence that the user will terminate access to a particular service or source. Based on the score, the media guidance application may generate promotions and advertisements that entice the user to keep the particular service or source indicated by the score as one to which the user will likely terminate access.

Media guidance applications may be, for example, stand-alone applications implemented on user equipment devices. For example, the media guidance application may be implemented as software or a set of executable instructions which may be stored in storage 308, and executed by control circuitry 304 of a user equipment device 300. In some embodiments, media guidance applications may be client-server applications where only a client application resides on the user equipment device, and server application resides on a remote server. For example, media guidance applications may be implemented partially as a client application on control circuitry 304 of user equipment device 300 and partially on a remote server as a server application (e.g., media guidance data source 418) running on control circuitry of the remote server. When executed by control circuitry of the remote server (such as media guidance data source 418), the media guidance application may instruct the control circuitry to generate the guidance application displays and transmit the generated displays to the user equipment devices. The server application may instruct the control circuitry of the media guidance data source 418 to transmit data for storage on the user equipment. The client application may instruct control circuitry of the receiving user equipment to generate the guidance application displays.

Content and/or media guidance data delivered to user equipment devices 402, 404, and 406 may be over-the-top (OTT) content. OTT content delivery allows Internet-enabled user devices, including any user equipment device described above, to receive content that is transferred over the Internet, including any content described above, in addition to content received over cable or satellite connections. OTT content is delivered via an Internet connection provided by an Internet service provider (ISP), but a third party distributes the content. The ISP may not be responsible for the viewing abilities, copyrights, or redistribution of the content, and may only transfer IP packets provided by the OTT content provider. Examples of OTT content providers include YOUTUBE, NETFLIX, and HULU, which provide audio and video via IP packets. Youtube is a trademark owned by Google Inc., Netflix is a trademark owned by Netflix Inc., and Hulu is a trademark owned by Hulu, LLC. OTT content providers may additionally or alternatively provide media guidance data described above. In addition to content and/or media guidance data, providers of OTT content can distribute media guidance applications (e.g., web-based applications or cloud-based applications), or the content can be displayed by media guidance applications stored on the user equipment device.

Media guidance system 400 is intended to illustrate a number of approaches, or network configurations, by which user equipment devices and sources of content and guidance data may communicate with each other for the purpose of accessing content and providing media guidance. The embodiments described herein may be applied in any one or a subset of these approaches, or in a system employing other approaches for delivering content and providing media guidance. The following four approaches provide specific illustrations of the generalized example of FIG. 4.

In one approach, user equipment devices may communicate with each other within a home network. User equipment devices can communicate with each other directly via short-range point-to-point communication schemes described above, via indirect paths through a hub or other similar device provided on a home network, or via communications network 414. Each of the multiple individuals in a single home may operate different user equipment devices on the home network. As a result, it may be desirable for various media guidance information or settings to be communicated between the different user equipment devices. For example, it may be desirable for users to maintain consistent media guidance application settings on different user equipment devices within a home network, as described in greater detail in Ellis et al., U.S. Patent Publication No. 2005/0251827, filed Jul. 11, 2005. Different types of user equipment devices in a home network may also communicate with each other to transmit content. For example, a user may transmit content from user computer equipment to a portable video player or portable music player.

In a second approach, users may have multiple types of user equipment by which they access content and obtain media guidance. For example, some users may have home networks that are accessed by in-home and mobile devices. Users may control in-home devices via a media guidance application implemented on a remote device. For example, users may access an online media guidance application on a website via a personal computer at their office, or a mobile device such as a PDA or web-enabled mobile telephone. The user may set various settings (e.g., recordings, reminders, or other settings) on the online guidance application to control the user's in-home equipment. The online guide may control the user's equipment directly, or by communicating with a media guidance application on the user's in-home equipment. Various systems and methods for user equipment devices communicating, where the user equipment devices are in locations remote from each other, is discussed in, for example, Ellis et al., U.S. Pat. No. 8,046,801, issued Oct. 25, 2011, which is hereby incorporated by reference herein in its entirety.

In a third approach, users of user equipment devices inside and outside a home can use their media guidance application to communicate directly with content source 416 to access content. Specifically, within a home, users of user television equipment 402 and user computer equipment 404 may access the media guidance application to navigate among and locate desirable content. Users may also access the media guidance application outside of the home using wireless user communications devices 406 to navigate among and locate desirable content.

In a fourth approach, user equipment devices may operate in a cloud computing environment to access cloud services. In a cloud computing environment, various types of computing services for content sharing, storage or distribution (e.g., video sharing sites or social networking sites) are provided by a collection of network-accessible computing and storage resources, referred to as "the cloud." For example, the cloud can include a collection of server computing devices, which may be located centrally or at distributed locations, that provide cloud-based services to various types of users and devices connected via a network such as the Internet via communications network 414. These cloud resources may include one or more content sources 416 and one or more media guidance data sources 418. In addition or in the alternative, the remote computing sites may include other user equipment devices, such as user television equipment 402, user computer equipment 404, and wireless user communications device 406. For example, the other user equipment devices may provide access to a stored copy of a video or a streamed video. In such embodiments, user equipment devices may operate in a peer-to-peer manner without communicating with a central server.

The cloud provides access to services, such as content storage, content sharing, or social networking services, among other examples, as well as access to any content described above, for user equipment devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a user equipment device to store content to the cloud and to receive content from the cloud rather than storing content locally and accessing locally-stored content.

A user may use various content capture devices, such as camcorders, digital cameras with video mode, audio recorders, mobile phones, and handheld computing devices, to record content. The user can upload content to a content storage service on the cloud either directly, for example, from user computer equipment 404 or wireless user communications device 406 having content capture feature. Alternatively, the user can first transfer the content to a user equipment device, such as user computer equipment 404. The user equipment device storing the content uploads the content to the cloud using a data transmission service on communications network 414. In some embodiments, the user equipment device itself is a cloud resource, and other user equipment devices can access the content directly from the user equipment device on which the user stored the content.

Cloud resources may be accessed by a user equipment device using, for example, a web browser, a media guidance application, a desktop application, a mobile application, and/or any combination of access applications of the same. The user equipment device may be a cloud client that relies on cloud computing for application delivery, or the user equipment device may have some functionality without access to cloud resources. For example, some applications running on the user equipment device may be cloud applications, i.e., applications delivered as a service over the Internet, while other applications may be stored and run on the user equipment device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, user equipment devices can use cloud resources for processing operations such as the processing operations performed by processing circuitry described in relation to FIG. 3.

In some embodiments, the media guidance application may show media asset consumption and interaction history to a user. The media guidance application may generate for display a first plurality of media asset identifiers corresponding to a first plurality of media assets scheduled for transmission to a plurality of users during present and future time intervals. For example, the media guidance application may be implemented on a user device that includes components of device 300 (FIG. 3). The media guidance application may be implemented on any user device such as devices 402, 404, or 406 (FIG. 4). The media guidance application may have access to media assets and media asset identifiers. Media assets may be stored at media content source 416 and/or media guidance data source 418. Media asset identifiers may also be stored at media content source 416 and/or media guidance data source 418. The media guidance application may retrieve media asset identifiers from media content source 416 and/or media guidance data source 418 through communications network 414. The media guidance application may also retrieve media asset identifiers from media content source 416 and/or media guidance data source 418. The media guidance application may generate for display media asset identifiers to be displayed on display 312 or on a display that is external to the device where the media guidance application is implemented.

The media guidance application may generate display screen 100 (FIG. 1) that includes media asset identifiers corresponding to media assets being currently transmitted to a plurality of users and media assets scheduled to be transmitted to a plurality of users in the future. Details of FIG. 1 have been discussed above. Alternatively or additionally, the media guidance application may also generate display screen 200 that includes media asset identifiers corresponding to media assets currently transmitted to a plurality of users.

In some embodiments, the media guidance application may receive a request to navigate to a past time interval. For example, the media guidance application may be implemented on a device with components of device 300 (FIG. 3). The media guidance application may receive the request through user input interface 310. The media guidance application may also receive the request from a user or from another device. For example, the media guidance application may receive the request through a user operating a remote control. In another example, the media guidance application may receive the request from a remote device (e.g., user television equipment 402, user computer equipment 404, or any device 406) through communications network 414. The media guidance application may also receive the request from media content source 416 and/or media guidance data source 418 through communications network 414.

In some embodiments, the media guidance application may, based on receiving a request to navigate to a past time interval, identify a second plurality of media assets that were transmitted to a plurality of users during the past time interval. The media guidance application may analyze the received request and determine (e.g., via control circuitry 304) the time interval requested. For example, the media guidance application may detect (e.g., through user input interface 310 (FIG. 3)) that the requested prior time interval is a time interval adjacent to the current time interval. If, for example, the media guidance application determines that the current time interval is from 5 PM to 8 PM and the request is for the prior adjacent time interval, then the media guidance application may determine that the requested time interval is 2 PM to 5 PM. In some embodiments, the media guidance application may determine time intervals in three-hour periods. However, in other embodiments, the media guidance application may determine time intervals in two-hour periods, four-hour periods, etc. In some embodiments, the media guidance application may enable a user to select a length of the time intervals. The media guidance application may then identify the media assets that were transmitted during the determined time interval.

Figure 5:
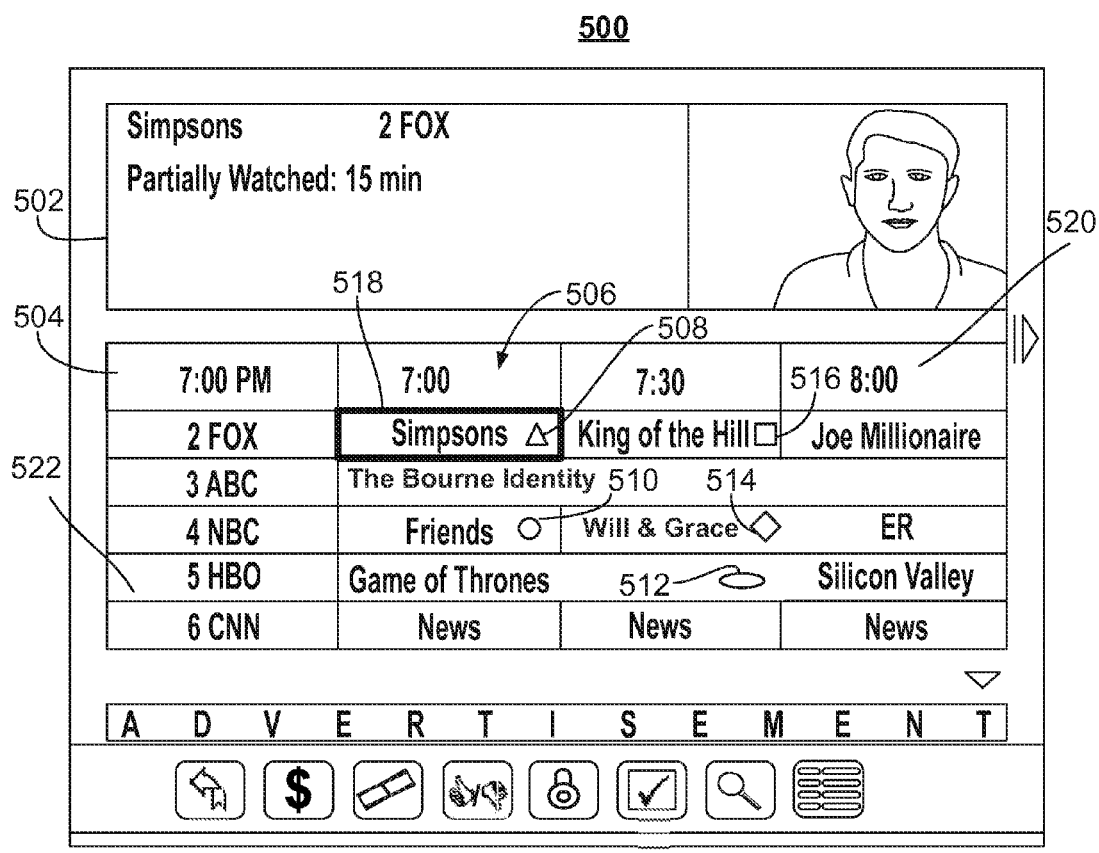
FIG. 5 shows an illustrative embodiment of a display screen to provide consumption history, in accordance with some embodiments of the disclosure.

For example, if the media guidance application determines that the request is for an identical time period as displayed in display screen 100 (FIG. 1), but for a different day, the media guidance application may generate display screen 500 (FIG. 5). The media guidance application may identify the media assets that were transmitted during the determined time interval by, for example, accessing a database that stores media asset identifiers and schedules as to when the media assets corresponding to those media asset identifiers are to be transmitted to a plurality of users. The database may reside locally on the user equipment (e.g., in storage 308 or remotely at media content source 416 and/or media guidance data source 418. The media guidance application may access both media content source 416 and media guidance data source 418 through communications network 414. [0080] In some embodiments, the media guidance application may, based on receiving a request to navigate to a past time interval, generate for display a second plurality of media asset identifiers corresponding to the second plurality of media assets. For example, the media guidance application may generate for display (e.g., via control circuitry 304) media asset identifiers for media assets that were transmitted during a three-hour time interval 24 hours from the current time. The media guidance application may generate for display, for example, display screen 500 that includes a three-hour time period during a prior day. Media asset identifiers (e.g., media asset identifier 518) may correspond to a second plurality of media asset identifiers discussed above. If the device where the media guidance application resides includes a display (e.g., display 312), the media guidance application may generate the second plurality of media asset identifiers to be displayed on that display. Additionally, or alternatively, the media guidance application may generate for display the second plurality of media asset identifiers to be displayed on a display of another device (e.g., user television equipment 402, user computer equipment 404, and/or any device 406). The media guidance application may communicate directly with devices 402, 404 and/or 406 or through communications network 414.

In some embodiments, the media guidance application may visually distinguish a first portion of the second plurality of media asset identifiers, corresponding to media assets associated with previously monitored user interactions, from a second portion of the second plurality of media asset identifiers corresponding to media assets that are not associated with previously monitored user interactions. The media guidance application, as part of the distinguishing process, may generate for display a first media asset identifier in the first portion that is visually distinguished from a second media asset identifier in the first portion based on type of previously monitored user interaction. As referred to herein, the term "type of monitored user interaction" refers to any type of action that a user takes with respect to a media asset. For example, a type of user interaction with respect to a media asset may be any of the following: fully consuming, partially consuming, purchasing, setting a reminder, recording without consuming, recording and partially consuming, recording and fully consuming, and recording and erasing.

For example, FIG. 5 illustrates one such display screen. In FIG. 5, the media guidance application determined that the user has not interacted with the media asset corresponding to "Joe Millionaire" and has interacted with "Friends" and "King of the Hill". Therefore, the media guidance application generated for display the media asset identifier corresponding to "Joe Millionaire" without an indicator and media asset identifiers corresponding to "King of the Hill" and "Friends" with respective indicators 516 and 510. In addition, the media guidance application has determined that "King of the Hill" and "Friends" have corresponding types of previously monitored user interactions that are different from each other. Therefore, the media guidance application generated for display the media asset identifier for "King of the Hill" with indicator 516 and the media asset identifier for "Friends" with indicator 510, which is different from indicator 516.

The media guidance application may determine (e.g., via control circuitry 304) the first portion of media asset identifiers corresponding to media assets that the user previously interacted with and a second portion of media asset identifiers corresponding to media assets that the user previously has not interacted with. The media guidance application may make the determination by, for example, accessing a database that lists media assets and any monitored user interactions associated with those media assets. The database may reside locally in storage 308 and/or remotely at media content source 416 and/or media guidance data source 418. Additionally or alternatively, parts of the database may reside locally in storage 308, at media content source 416 and at media guidance data source 418. The media guidance application may retrieve any data residing at media content source 416 or media guidance data source 418 via communications network 414. In some embodiments, the media guidance application may store multiple copies of the data (e.g., in storage 308 and at media guidance data source 418 and/or media content source 416).

The media guidance application may then cross-reference each media asset of the second plurality of media assets with a database listing media assets and previously monitored user interactions corresponding to those media assets. As a result, the media guidance application may determine (e.g., via control circuitry 304) which media assets of the second plurality of media assets are listed in the database and select those media assets to be included in the first portion. The media guidance application may select the media assets that are not in the database to be included in the second portion. If the media guidance application is implemented on the same device where the database resides, the media guidance application may perform the cross-referencing by accessing the database in storage 308 via control circuitry 304. If the database resides at media content source 416 or media guidance data source 418, the media guidance application may access the database via communications network 414. In some embodiments, the media guidance application may, when storing monitored user interactions, assign each media asset and identification code, which can later be used in cross-referencing. For example, the media guidance application may generate a hash entry for a media asset based on the media asset identifier of the media asset. The media guidance application may then use the generated hash entry as an identification code for that particular media asset. At a later time, when the media guidance application performs the cross-referencing step, the media guidance application may generate a hash of the media asset being cross-referenced based on the media asset identifier corresponding to that media asset and compare that hash to hashes stored in the database in order to determine whether the media asset has any corresponding user interactions associated with it.

Once the media guidance application selects media assets for the first portion and the second portion, the media guidance application may generate for display (e.g., on display 312 or on a display associated with another device) both the first portion and the second portion. The media guidance application may generate for display media asset identifiers corresponding to the first portion with indicators indicating corresponding previously monitored user interactions. As described above, a first media asset identifier may include a first indicator corresponding to a first type of previously monitored user interaction, and a second media asset identifier may include a second indicator corresponding to a second type of previously monitored user interaction. For example, the media guidance application may associate different geographical shapes with different types of monitored user interactions, and those geographical shapes may be displayed as part of a media asset identifier for those media assets that have corresponding monitored user interactions. The media guidance application may assign a square to media assets that have been fully consumed, an oval to media assets that have been partially consumed, a rectangle to those media assets that have been recorded, but not consumed, a circle to those media assets that have been recorded and partially consumed, etc. In some embodiments the media guidance application may assign different colors to different types of user interactions. For example, the media guidance application may generate for display every media asset identifier corresponding to a media asset that was partially consumed in yellow, media assets that have been fully consumed in green, etc.

In some embodiments, the media guidance application may assign an audio cue to each type of monitored user interaction. For example, if the media guidance application receives a user selection of a media asset that the user has partially consumed, the media guidance application may produce a sound of a bell ringing, and if the media guidance application receives a user selection of a media asset that was fully consumed, the media guidance application may play a chime.

In some embodiments, the media guidance application may enable a user to modify the indicators assigned to each type of monitored user interaction. The media guidance application may generate for display a plurality of indicators for a plurality of types of previously monitored user interactions and a plurality of options that enable the user to modify each indicator of the plurality of indicators. The media guidance application may, based on a user selection of an option of the plurality of options, modify the plurality of indicators based on the selected option. For example, the media guidance application may assign a square, oval, rectangle, circle, triangle, and trapezoid to fully consuming, partially consuming, recording without consuming, recording and partially consuming, recording and fully consuming, and recording and erasing, respectively. The media guidance application may enable the user to change the type of user interaction corresponding to each shape. The media guidance application may also enable the user to select a different identifier for different types of monitored user interactions. For example, the media guidance application may enable the user to change shapes to colors, add audio cues, etc. The media guidance application may also enable a user to assign specific audio cues to different types of monitored user interactions and also input (e.g., via user input interface 312) custom audio cues.

In some embodiments, the media guidance application may, based on a user selection of the first media asset identifier, generate for display information associated with the previously monitored user interaction corresponding to a media asset associated with the first media asset identifier. For example, if the media guidance application receives a user selection of a media asset identifier that corresponds to a media asset that the user partially consumed, the media guidance application may generate for display information about the media asset (e.g., title) and the time that the user started consuming the media asset, the time that the user stopped consuming the media asset, the length of a portion of the media asset that the user consumed, and the length of a portion of the media asset that the user has not yet consumed. Area 502 of FIG. 5 illustrates a display of information associated with the previously monitored user interaction.

In some embodiments, the media guidance application may, based on a first user input, generate for display media asset identifiers associated with a first type of previously monitored user interaction and, based on a second user input, generate for display media asset identifiers associated with a second type of previously monitored user interaction. For example, the media guidance application may enable a user to view only media asset identifiers associated with media assets that the user has partially consumed. The media guidance application may enable the user (e.g., via user input interface 310) to provide an input to generate for display only those media asset identifiers that correspond to media assets that the user has partially consumed. In another example, the media guidance application may enable a user to provide input to generate for display those media asset identifiers that correspond to media assets that the user recorded and erased, but never consumed.

In some embodiments, the media guidance application may enable a user to finish consuming a media asset that the user partially consumed in the past when that media asset will be available in the future. In order to perform that task, the media guidance application may first receive an indication from the user to consume a media asset associated with the first media asset identifier. For example, the media guidance application may receive a user selection (e.g., via user input interface 312) of a media asset identifier corresponding to a media asset that the user desires to consume.

The media guidance application may then determine that a type of previously monitored user interaction associated with the media asset is the user partially consuming the media asset. The media guidance application may make the determination with any methods described above (e.g., by comparing a hash value of the media asset identifier with a database listing media assets, hashes of those media asset identifiers, and corresponding previously monitored user interactions).

The media guidance application may then determine that the media asset will be available for consumption at a future time. The media guidance application may compare (e.g., via control circuitry 304) the media asset identifier corresponding to the media asset that the user desires to consume with media asset identifiers corresponding to media assets that will be transmitted in the future or are being transmitted in the present. For example, the media guidance application may compare the media asset identifier corresponding to the desired movie with media asset identifiers that are stored in storage 308 in order to determine if the media asset will be available for consumption in the future. Alternatively or additionally, the media guidance application may search media content source 416 and/or media guidance data source 418 for a match.

The media guidance application may then retrieve a time interval corresponding to a portion of the media asset that the user has not consumed. The media guidance application may access the database listing media assets and corresponding monitored user interaction in order to retrieve the time interval from the database. Additionally or alternatively, the media guidance application may calculate the time interval based on the time the user started consuming the specific media asset and the time the user stopped consuming the specific media asset. Once the calculation is complete, the media guidance application may store the value in storage 308 for later retrieval. Additionally or alternatively, the media guidance application may store the value at media content source 416 and/or media guidance data source 418 for later retrieval.

In some embodiments, the media guidance application may schedule, for recording, the portion of the media asset that the user has not consumed. For example, if the user consumed a first hour of a two-hour movie, the media guidance application may only record the second hour of the two-hour movie.

In some embodiments, instead of or in addition to determining that the media asset will be available for consumption at a future time, the media guidance application may determine whether the media asset is available on demand. The media guidance may make that determination by searching available-on-demand media assets for a match. The search may be performed by using any of the methods described above. If the media guidance application finds a match, the media guidance application may then determine a cost associated with the media asset. The media guidance application may make the determination by accessing a database of on-demand media assets and their corresponding costs and retrieving the value corresponding to the cost associated with the media asset. The database may be located in storage 308 on the device that implements the media guidance application or may be located at media content source 416 and/or media guidance data source 418, both accessible via communications network 414. The media guidance application may then generate for display a prompt to the user indicating a price that the user must pay for the portion of the media asset that the user has not consumed, where the price is a portion of the cost associated with the media asset. The media guidance application may determine that, because the user consumed half of the media asset, the user must only pay fifty percent of the cost to consume the other half of the media asset. Alternatively, the media guidance application may have a fixed cost associated with consuming a partially viewed media asset (e.g., 75% of the full price). And finally, the media guidance application may, based on the user indicating an agreement with the price, generate for display the media asset starting from a beginning of the portion of the media asset that has not been consumed.

In some embodiments, the media guidance application may generate a display, including media assets identifiers corresponding to media assets transmitted in the past, in a grid. The media guidance application may generate for display a first plurality of indicators corresponding to a plurality of content sources along a first axis and a second plurality of indicators corresponding to a plurality of time periods along a second axis, where the plurality of time periods is within the time interval. The media guidance application may also generate for display the second plurality of media asset identifiers, where each media asset identifier of the second plurality of media asset identifiers is displayed according to a respective source and a respective time period. Additionally, the media guidance application may generate for display, for each media asset identifier in the first portion of the second plurality of media asset identifiers, an indicator corresponding to a respective type of previously monitored user interaction associated with a respective media asset identifier.

FIG. 5 shows an illustrative example of the grid described above. Display screen 500 represents a screen associated with one embodiment of the media guidance application. The media guidance application may generate for display screen 500 based on a request for a plurality of media asset identifiers corresponding to media assets transmitted in the past. For example, the media guidance application may generate display screen 100 that includes media asset identifiers corresponding to media assets currently transmitted to a plurality of users and media assets that are scheduled to be transmitted to a plurality of users in the future. The media guidance application may receive a request to display a prior time interval (e.g., same time interval yesterday). The media guidance application may generate display screen 500 based on the request (e.g., request from a user) while display screen 100 is displayed. Time 504 represents a beginning of the past time interval displayed. Vertical axis 520 represents different content sources and horizontal axis 522 represents time periods within the selected time interval. For example, content sources may correspond to different channels as shown in vertical axis 520. Additionally or alternatively, content sources may correspond to on-demand media assets, internet sources, locally stored content or any other media source available to a user. Time periods in horizontal axis 520 (e.g., time period 506) may be of any length, for example, 30 minutes, one hour, two hours, three hours, etc.

The media guidance application may generate for display media asset identifiers (e.g., media asset identifier 518) that correspond to media assets that were transmitted in the past. Together with the media asset identifiers, the media guidance application may generate for display indicators (e.g., indicators 508, 510, 512, 514, and 516) to represent different types of previously monitored user interactions with respect to the media assets corresponding to the respective media asset identifiers. For example, indicator 508 may represent a user partially consuming a media asset, indicator 510 may represent the user fully consuming the media asset, indicator 512 may represent the user recording the media asset and not consuming it, indicator 514 may represent the user recording the media asset and fully consuming it, and indicator 516 may represent the user recording the media asset and erasing it at a later time.

The media guidance application may generate for display area 502, which may include information about a selected media asset. For example, in FIG. 5, a media asset identifier 518 corresponding to "The Simpsons" is selected and as a result, details of previously monitored user interactions with "The Simpsons" are displayed. For example, area 502 informs the user that the user partially watched that episode of "The Simpsons" and that the user watched fifteen minutes of that episode.

Although display screens 100 and 500 look slightly different, the media guidance application may generate for display a display screen for a past time interval that is identical to display screen 100, but includes indicators 510, 512, 514, and 516 to indicate types of previously monitored user interactions corresponding to media assets that the user interacted with.

Figure 6:
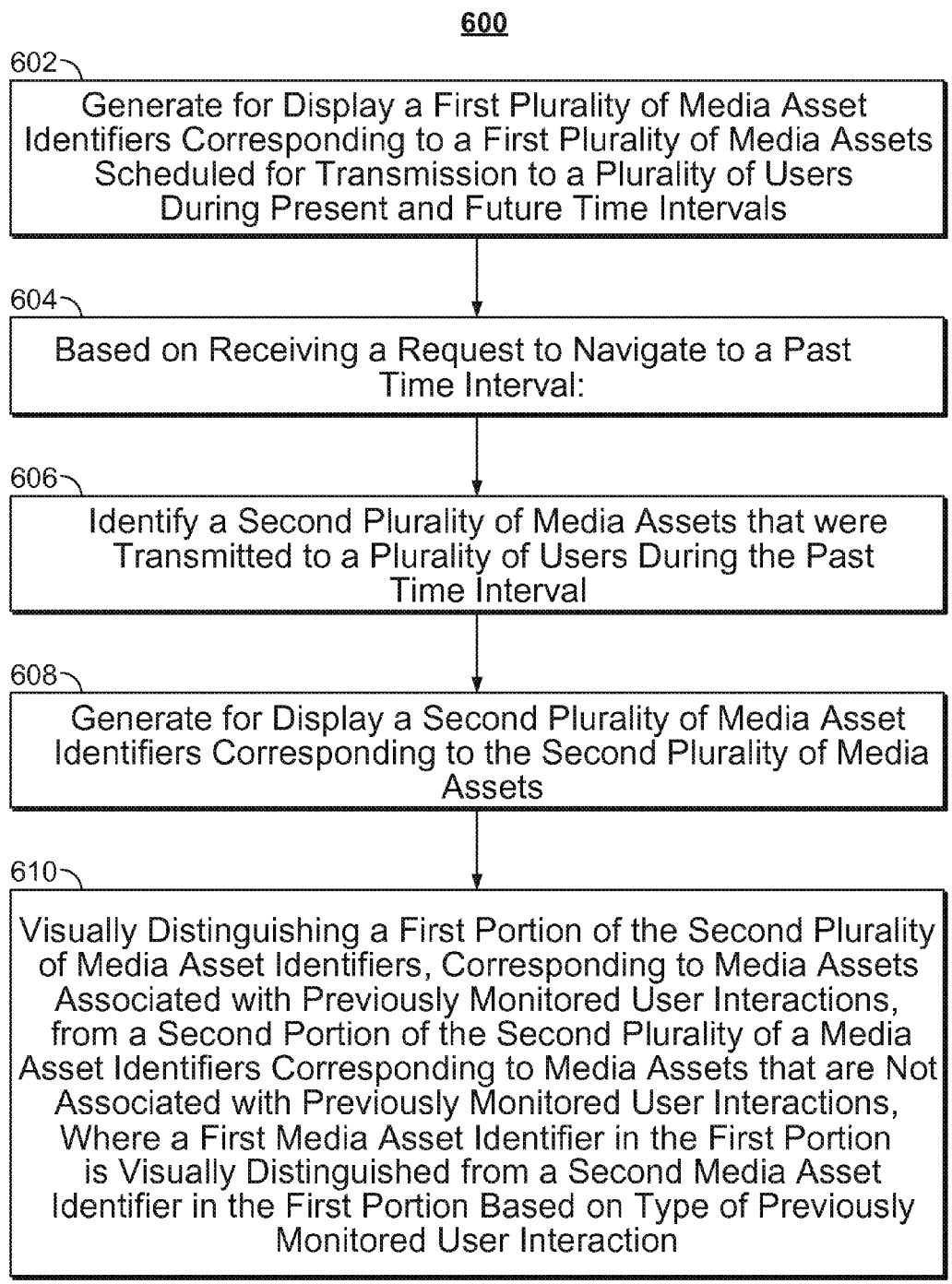
FIG. 6 is a flowchart of illustrative steps involved in providing consumption history to a user, in accordance with some embodiments of the disclosure.

FIG. 6 is a flowchart of illustrative steps involved in providing consumption and interaction history to a user. It should be noted that process 600 or any step thereof could be performed on, or provided by, any of the devices shown in FIGS. 3-4. For example, process 600 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 600 may be incorporated into or combined with one or more steps of any other process or embodiment (e.g., process 700 (FIG. 7)).

At step 602, a media guidance application generates for display (e.g., via control circuitry 304 on display 312 (FIG. 3)) a first plurality of media asset identifiers corresponding to a first plurality of media assets scheduled for transmission to a plurality of users during present and future time intervals. For example, as discussed above, the media guidance application may generate for display screen 100.

At step 604, the media guidance application, based on receiving a request to navigate to a past time interval, moves to step 606. For example, the media guidance application may receive the request from a user through user input interface 310. In another example, the media guidance application may receive the request from another device (e.g., User Television Equipment 402, User Computer Equipment 404, and any device 406). The media guidance application may receive the request directly from any device or through communications network 414. Additionally or alternatively, the media guidance application may receive the request from media content source 416 and/or from media guidance data source 418 through communications network 414. The media guidance application may receive the request for any past time interval navigable by the media guidance application. For example, the media guidance application may receive the request (e.g., via user input interface 312) by receiving a simple press of a button on a remote control to navigate to a time interval immediately prior to the current time interval. In another example, the media guidance application may receive input for a time period 24 hours in the past or two weeks in the past.

At step 606, the media guidance application, based on receiving a request to navigate to a past time interval, identifies (e.g., via control circuitry 304) a second plurality of media assets that were transmitted to a plurality of users during the past time interval. The media guidance application may search a database listing media assets and the corresponding transmission times for media assets that were transmitted at the time interval specified by the request. The media guidance application may search (e.g., via control circuitry 304) the database by comparing each time period in the time interval to the stored start time of each media asset. The database may reside in storage 308, on another device (e.g., user equipment television equipment 402, user computer equipment 404, or any device 406), at media content source 416, or media guidance data source 418. The media guidance application may access the database directly or through communications network 414.

At step 608, the media guidance application, based on receiving a request to navigate to a past time interval, generates for display (e.g., via control circuitry 304 on display 312) a second plurality of media asset identifiers corresponding to the second plurality of media assets. At step 610, the media guidance application, based on receiving a request to navigate to a past time interval, visually distinguishes a first portion of the second plurality of media asset identifiers, corresponding to media assets associated with previously monitored user interactions, from a second portion of the second plurality of media asset identifiers corresponding to media assets that are not associated with previously monitored user interactions, where a first media asset identifier in the first portion is visually distinguished from a second media asset identifier in the first portion based on type of previously monitored user interaction. For example, the media guidance application may generate for display a screen illustrated in FIG. 5.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 6.

Figure 7:
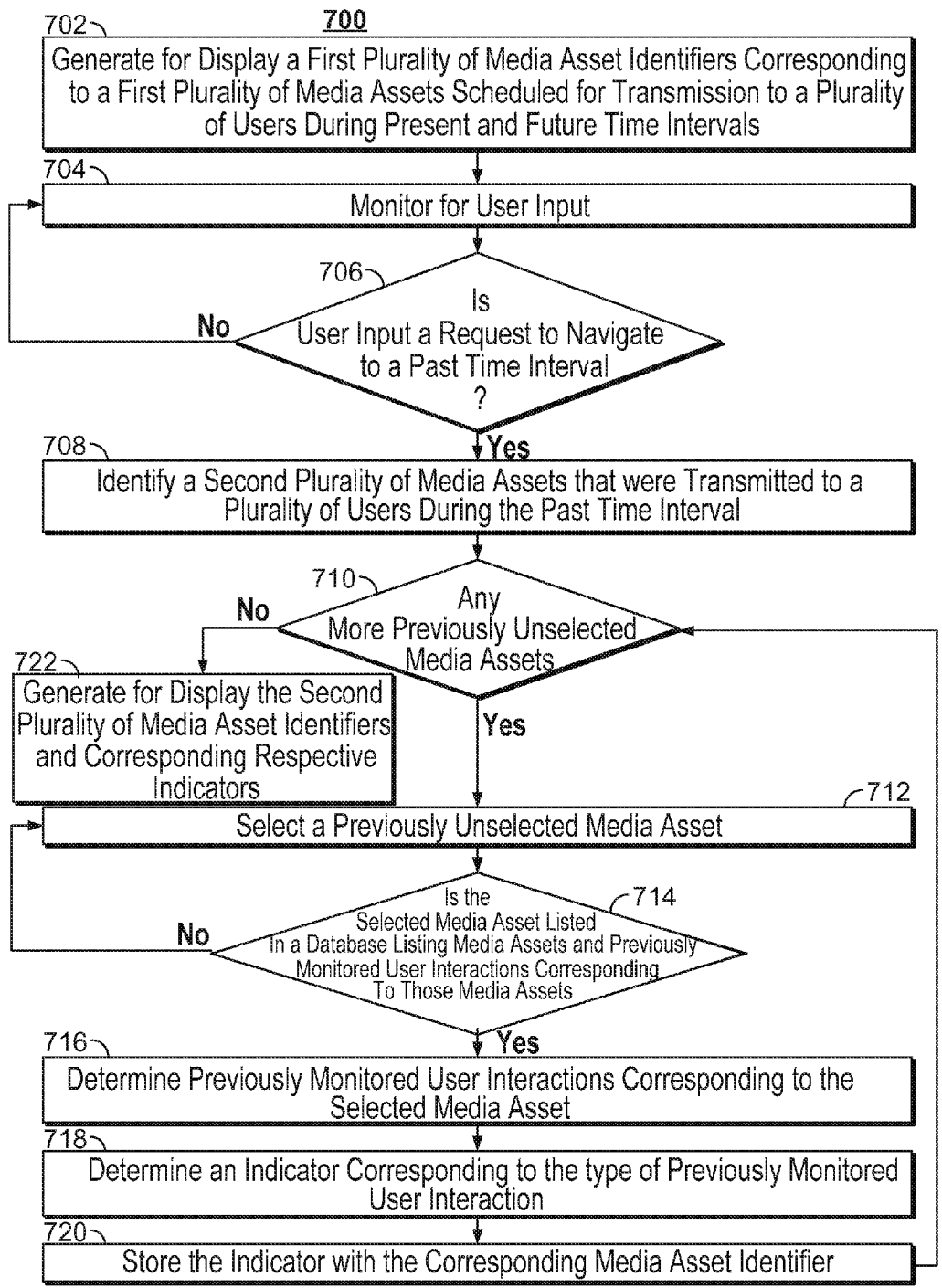
FIG. 7 is a flowchart of illustrative steps involved in providing further details for providing consumption history to a user, in accordance with some embodiments of the disclosure.

FIG. 7 is a flowchart of illustrative steps involved in providing further details for providing consumption and interaction history to a user. It should be noted that process 700 or any step thereof could be performed on, or provided by, any of the devices shown in FIGS. 3-4. For example, process 700 may be executed by control circuitry 304 (FIG. 3) as instructed by a media guidance application implemented on user equipment 402, 404, and/or 406 (FIG. 4) in order to distribute control of media guidance application operations for a target device among multiple user devices. In addition, one or more steps of process 700 may be incorporated into or combined with one or more steps of any other process or embodiment (e.g., process 600 (FIG. 6)).

At step 702, a media guidance application generates for display (e.g., via control circuitry 304 on display 312 (FIG. 3)) a first plurality of media asset identifiers corresponding to a first plurality of media assets scheduled for transmission to a plurality of users during present and future time intervals. For example, as discussed above, the media guidance application may generate for display screen 100.

At step 704, the media guidance application monitors (e.g., via control circuitry 304) for user input. The media guidance application may receive user input through user input interface 312 or from another device (e.g., devices 402, 404, and 406). The media guidance application may also receive user input from media guidance data source 418 and/or from media content source 416 through communications network 414.

At step 706, the media guidance application determines (e.g., via control circuitry 304) whether user input is a request to navigate to a past time interval. The media guidance application may make that determination based on the contents of the request. For example, if the media guidance application determines that the request contains a left arrow press of a remote control, the media guidance application may determine that the request is to navigate to a past time interval. If the media guidance application determines that the user input is not a request to navigate to a past time interval, the process moves to step 704. If the media guidance application determines that the user input is a request to navigate to a past time interval, the process moves to step 708.

At step 708, the media guidance application identifies (e.g., via control circuitry 304) a second plurality of media asset identifiers that were transmitted to a plurality of users during the past time interval. The media guidance application may identify the second plurality of media asset identifiers in the same manner as in process 600.

At step 710, the media guidance application determines (e.g., via control circuitry 304) whether there are any more previously unselected media assets that were identified in step 708. If there are no more previously unselected media assets, the media guidance application generates for display the second plurality of media asset identifiers and corresponding respective indicators. For example, the media guidance application may generate a display screen 500 of FIG. 5. If there are more previously unselected media assets, the process moves to step 712.

At step 712, the media guidance application selects (e.g., via control circuitry 304) a previously unselected media asset. For example, the media guidance application may select a media asset associated with a specific media asset identifier identified in step 708.

At step 714, the media guidance application determines (e.g., via control circuitry 304) whether the selected media asset is listed in a database listing media assets and previously monitored user interactions corresponding to those media assets. For example, the media guidance application may search the database with any conventional methods or any methods described above.

At step 716, the media guidance application determines (e.g., via control circuitry 304) previously monitored user interactions corresponding to the selected media asset. For example, the media guidance application may determine that the previously monitored user interaction corresponding to the selected media asset is a user partially consuming the selected media asset.

At step 718, the media guidance application determines (e.g., via control circuitry 304) an indicator corresponding to the type of previously monitored user interaction. For example, the media guidance application may determine that the indicator corresponding to the type of the monitored user interaction is a triangle.

At step 720, the media guidance application stores (e.g., via control circuitry 304 in storage 308) the indicator with the corresponding media asset identifier. For example, the media guidance application may store the indicator in storage 308. Additionally or alternatively, the media guidance application may store the indicator at media content source 416 or at media guidance data source 418.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order or in parallel or substantially simultaneously to reduce lag or increase the speed of the system or method. Furthermore, it should be noted that any of the devices or equipment discussed in relation to FIGS. 3-4 could be used to perform one or more of the steps in FIG. 7.

The above-described embodiments of the present disclosure are presented for purposes of illustration and not of limitation, and the present disclosure is limited only by the claims that follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted, the systems and/or methods described above may be applied to, or used in accordance with, other systems and/or methods.

What is claimed is:

1. A method for showing media asset consumption history, the method comprising:
  generating for display a first plurality of media asset identifiers corresponding to a first plurality of media assets scheduled for transmission to a plurality of users during present and future time intervals; and
  based on receiving a request to navigate to a past time interval:
    identifying a second plurality of media assets that were transmitted to the plurality of users during the past time interval;
    generating for display a second plurality of media asset identifiers corresponding to the second plurality of media assets;
    determining that a first media asset identifier and a second media asset identifier are associated with a first portion of the second plurality of media asset identifiers, wherein the first portion of the second plurality of media asset identifiers corresponds to media assets associated with previously monitored user interactions;
    determining that the first media asset identifier is associated with a first type of previously monitored user interaction, and that the second media asset identifier is associated with a second type of previously monitored user interaction, different from the first type of previously monitored user interaction;
    retrieving a first indicator corresponding to the first type of previously monitored user interaction and a second indicator corresponding to the second type of previously monitored user interaction; and
    visually distinguishing the first portion of the second plurality of media asset identifiers from a second portion of the second plurality of media asset identifiers that corresponds to media assets that are not associated with previously monitored user interactions by generating for display the first media asset identifier with the first indicator and the second media asset identifier with the second indicator.

2. The method of claim 1, wherein types of previously monitored user interactions comprise fully viewing, partially viewing, recording without viewing, recording and partially viewing, recording and fully viewing, and recording and erasing.

3. The method of claim 1, further comprising:
  receiving an indication from a user to consume a media asset associated with the first media asset identifier;
  determining that a type of previously monitored user interaction associated with the media asset is the user partially consuming the media asset;
  determining that the media asset will be available for consumption at a future time;
  retrieving a time interval corresponding to a portion of the media asset that the user has not consumed; and
  scheduling, for recording, the portion of the media asset that the user has not consumed.

4. The method of claim 1, further comprising:
  cross-referencing each media asset of the second plurality of media assets with a database listing media assets and previously monitored user interactions corresponding to those media assets;
  determining which media assets of the second plurality of media asset are listed in the database; and
  selecting the first portion based on the determining.

5. The method of claim 1, further comprising:
  generating for display a plurality of indicators for a plurality of previously monitored user interactions and a plurality of options that enable the user to modify each indicator of the plurality of indicators; and
  based on a user selection of an option of the plurality of options, modifying the plurality of indicators based on the selected option.

6. The method of claim 1, further comprising:
  based on a user selection of the first media asset identifier, generating for display information associated with the monitored user interaction corresponding to a media asset associated with the first media asset identifier.

7. The method of claim 1, further comprising:
  based on a first user input, generating for display media asset identifiers associated with the first type of previously monitored user interactions; and
  based on a second user input, generating for display media asset identifiers associated with the second type of previously monitored user interactions.

8. The method of claim 1, further comprising:
  generating for display a first plurality of indicators corresponding to a plurality of content sources along a first axis;
  generating for display a second plurality of indicators corresponding to a plurality of time periods along a second axis, wherein the plurality of time periods is within the time interval;
  generating for display the second plurality of media asset identifiers, wherein each media asset identifier of the second plurality of media asset identifiers is placed on a display according to a respective source and a respective time period; and
  generating for display, for each media asset identifier in the first portion of the second plurality of media asset identifiers, an indicator corresponding to a respective type of previously monitored user interaction associated with a respective media asset identifier.

9. A system for showing media asset consumption history, the system comprising:
  control circuitry configured to:
    generate for display a first plurality of media asset identifiers corresponding to a first plurality of media assets scheduled for transmission to a plurality of users during present and future time intervals; and
    based on receiving a request to navigate to a past time interval:
      identify a second plurality of media assets that were transmitted to the plurality of users during the past time interval;
      generate for display a second plurality of media asset identifiers corresponding to the second plurality of media assets;
      determine that a first media asset identifier and a second media asset identifier are associated with a first portion of the second plurality of media asset identifiers, wherein the first portion of the second plurality of media asset identifiers corresponds to media assets associated with previously monitored user interactions;

determine that the first media asset identifier is associated with a first type of previously monitored user interaction, and that the second media asset identifier is associated with a second type of previously monitored user interaction, different from the first type of previously monitored user interaction;

retrieve a first indicator corresponding to the first type of previously monitored user interaction and a second indicator corresponding to the second type of previously monitored user interaction; and visually distinguish the first portion of the second plurality of media asset identifiers from a second portion of the second plurality of media asset identifiers that corresponds to media assets that are not associated with previously monitored user interactions by generating for display the first media asset identifier with the first indicator and the second media asset identifier with the second indicator.

10. The system of claim 9, wherein types of previously monitored user interactions comprise fully viewing, partially viewing, recording without viewing, recording and partially viewing, recording and fully viewing, and recording and erasing.

11. The system of claim 9, wherein the control circuitry is further configured to:

receive an indication from a user to consume a media asset associated with the first media asset identifier;

determine that a type of previously monitored user interaction associated with the media asset is the user partially consuming the media asset;

determine that the media asset will be available for consumption at a future time;

retrieve a time interval corresponding to a portion of the media asset that the user has not consumed; and schedule, for recording, the portion of the media asset that the user has not consumed.

12. The system of claim 9, wherein the control circuitry is further configured to:

cross-reference each media asset of the second plurality of media assets with a database listing media assets and previously monitored user interactions corresponding to those media assets;

determine which media assets of the second plurality of media asset are listed in the database; and select the first portion based on the determining.

13. The system of claim 9, wherein the control circuitry is further configured to:

generate for display a plurality of indicators for a plurality of previously monitored user interactions and a plurality of options that enable the user to modify each indicator of the plurality of indicators; and based on a user selection of an option of the plurality of options, modify the plurality of indicators based on the selected option.

14. The system of claim 9, wherein the control circuitry is further configured to:

based on a user selection of the first media asset identifier, generate for display information associated with the monitored user interaction corresponding to a media asset associated with the first media asset identifier.

15. The system of claim 9, wherein the control circuitry is further configured to:

based on a first user input, generate for display media asset identifiers associated with the first type of previously monitored user interactions; and based on a second user input, generate for display media asset identifiers associated with the second type of previously monitored user interactions.

16. The system of claim 9, wherein the control circuitry is further configured to:

generate for display a first plurality of indicators corresponding to a plurality of content sources along a first axis;

generate for display a second plurality of indicators corresponding to a plurality of time periods along a second axis, wherein the plurality of time periods is within the time interval;

generate for display the second plurality of media asset identifiers, wherein each media asset identifier of the second plurality of media asset identifiers is placed on a display according to a respective source and a respective time period; and generate for display, for each media asset identifier in the first portion of the second plurality of media asset identifiers, an indicator corresponding to a respective type of previously monitored user interaction associated with a respective media asset identifier.

* * * * *